United States Patent
Fleckenstein et al.

[11] Patent Number: 5,709,728
[45] Date of Patent: Jan. 20, 1998

[54] METHOD AND DEVICE FOR THE PRODUCTION OF MINERAL WOOL BY USING MINERAL WOOL WASTE AS RECYCLED STARTING MATERIAL

[75] Inventors: Hermann Fleckenstein, Ludwigshafen; Helmut Hornung, Oftersheim, both of Germany

[73] Assignee: Isover Saint-Gobain, Courbevoie, France

[21] Appl. No.: 406,999

[22] PCT Filed: Jul. 29, 1994

[86] PCT No.: PCT/EP94/02526

§ 371 Date: Jul. 21, 1995

§ 102(e) Date: Jul. 21, 1995

[87] PCT Pub. No.: WO95/04003

PCT Pub. Date: Feb. 9, 1995

[30] Foreign Application Priority Data

Jul. 30, 1993 [DE] Germany .................. 43 25 726.7

[51] Int. Cl.⁶ .................. C03B 37/02; C03B 3/02
[52] U.S. Cl. .................. 65/482; 65/134.6; 65/134.7; 65/134.8; 65/135.9; 65/136.1; 65/136.3; 65/335; 65/475; 65/502; 65/540; 65/28
[58] Field of Search .................. 65/121, 324, 335, 65/347, 482, 475, 502, 540, 27, 28, 134.6, 134.7, 134.8, 135.9, 136.1, 136.2, 136.3; 432/180, 181

[56] References Cited

U.S. PATENT DOCUMENTS

| | | |
|---|---|---|
| 3,563,722 | 2/1971 | Troyankin et al. .................. 65/335 |
| 3,880,639 | 4/1975 | Bodner et al. .................. 65/134.6 |
| 4,113,459 | 9/1978 | Mattmuller . |
| 4,135,904 | 1/1979 | Suzuki et al. .................. 65/27 |
| 4,145,202 | 3/1979 | Grodin et al. .................. 65/27 X |
| 4,252,551 | 2/1981 | Nishimura . |
| 4,298,369 | 11/1981 | Froberg et al. .................. 65/335 X |
| 4,309,204 | 1/1982 | Brooks . |
| 4,422,862 | 12/1983 | Wardlaw .................. 65/27 X |
| 4,666,489 | 5/1987 | Demarest .................. 65/27 |
| 4,957,527 | 9/1990 | Hnat .................. 65/136.1 X |
| 5,100,453 | 3/1992 | Richards .................. 65/27 |
| 5,156,545 | 10/1992 | Deblock et al. .................. 432/8 |
| 5,352,258 | 10/1994 | DeGreve et al. .................. 65/27 X |

FOREIGN PATENT DOCUMENTS

| | | |
|---|---|---|
| 0137881 | 4/1985 | France . |
| 2568488 | 2/1986 | France .................. 65/134.8 |
| 0389314 | 9/1990 | France . |
| 0410889 | 1/1991 | France . |
| 83 226 | 7/1971 | Germany .................. 65/134.8 |
| 2348105 | 4/1975 | Germany . |
| 2938001 | 4/1981 | Germany . |
| 2952330 | 7/1981 | Germany . |
| 3101369 | 8/1982 | Germany . |
| 3335859 | 4/1985 | Germany . |
| 3347099 | 7/1985 | Germany . |
| 3607774 | 9/1987 | Germany . |
| 91/03435 | 3/1991 | WIPO .................. 65/134.8 |

*Primary Examiner*—Melvin Mayes
*Attorney, Agent, or Firm*—Cushman, Darby & Cushman Ip Group of Pillsbury Madison & Sutro LLP

[57] ABSTRACT

The melting tub for producing the molten mass from a mixture of raw material is associated with an additional melting unit by means of which a recycled molten mass is obtained from mineral wool waste largely corresponding to the molten mass obtained from the mixture of raw materials in quality and composition. The recycled molten mass is supplied to the molten mass in the melting tub through a suitable introduction device. The recycling exhaust gas from the additional melting unit is fed to the tub exhaust gas, and the mixture of exhaust gas is utilised for pre-heating combustion air and mixture of raw materials. Due to dividing "preparation of molten mass" into conventional production of molten mass from the mixture of raw materials in the melting tub and concurrent production of molten mass from mineral wool waste in an additional melting unit, molten products and exhaust gas of which are directly supplied to the melting tub, it is possible to utilise mineral wool waste as a recycled starting material in a cost-effective manner without affecting the complicated control of process parameters in conventional production of molten mass.

10 Claims, 2 Drawing Sheets

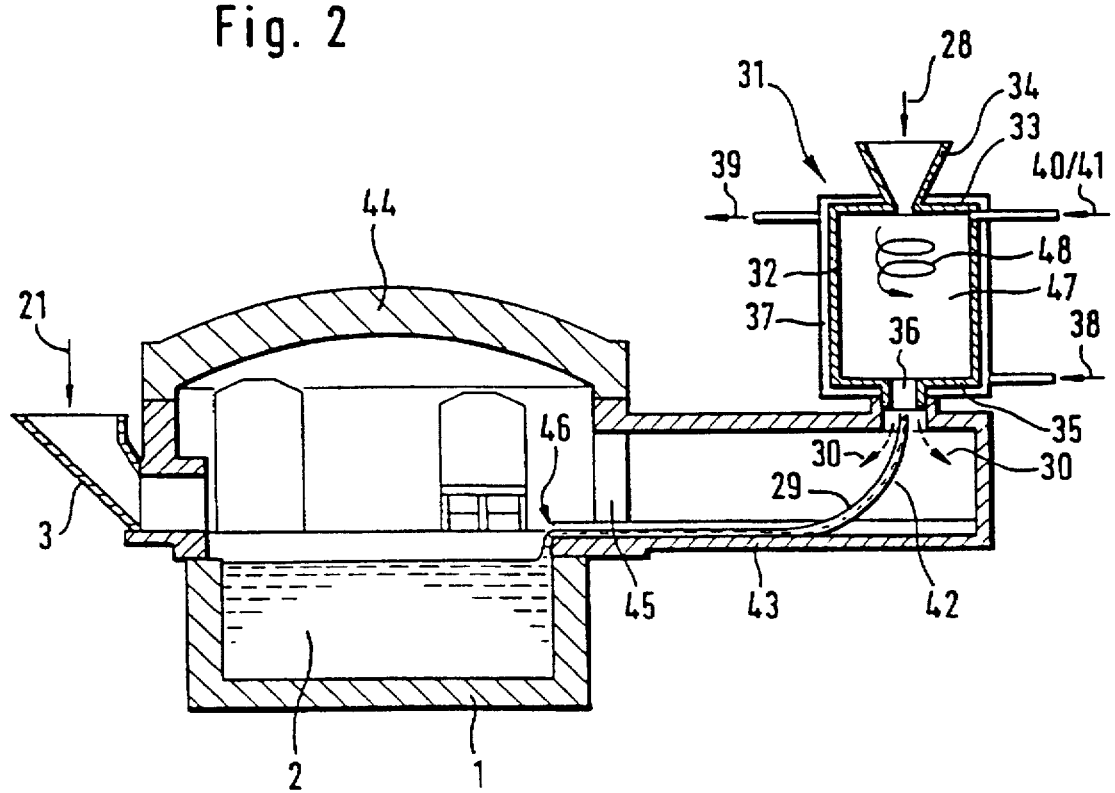

METHOD AND DEVICE FOR THE PRODUCTION OF MINERAL WOOL BY USING MINERAL WOOL WASTE AS RECYCLED STARTING MATERIAL

The invention concerns a method for the production of mineral wool by using wool waste as a recycled starting material and a device for producing such mineral wool.

BACKGROUND OF THE INVENTION

The large-scale use of mineral wool waste as a recycled starting material in the production of mineral wool has been aimed at for a long time. The intention is to utilise production scraps inherently arising in this system e.g. when trimming mineral wool webs, and refuse rejected by quality control. Not least the aim should also be to recover and utilise already used mineral wool products following their use by the purchaser. The mineral wool waste for recycling thus arises in varying amounts, and the arising amount may be as much as half of the starting material charged for producing the molten mass; it may therefore be in a 1:1 or higher ratio to the molten fresh mixture of raw materials.

Renewed melting of the mineral wool waste, however, is confronted by a variety of technological problems. A major problem resides in the fact that the larger part of the mineral wool waste contains organic substances, such as the binding agent used in producing a mineral wool felt, a mineral wool panel, or organic remainders stemming from its use, such as e.g. leftovers of roots. It is basically possible to introduce the associated carbon content into the molten mass when producing rock wool, however this unfavorably modifies the composition of the molten mass and attacks the refractory material of the melting tub; when producing glass wool, a substantial introduction of carbon into the molten mass is not permissible at all. In this latter case, it is possible to add an oxidising agent which, however, increases the starting material cost and affects exhaust gas emission, with the consequence that the addition of carbon-containing waste is in any case limited to low values.

In order to remove the carbon content of the mineral wool waste prior to melting in the melting tub, it is known from EP0 410 889A1 to subject the mineral wool waste to pyrolysis in a tunnel oven. To this end, the shredded waste is penetrated by a hot gas flow at a certain height of layer inside the tunnel oven and thereby annealed. The pyrolysis gas is inert or comprises an oxygen content reduced in comparison with air only to such an extent as to preclude the formation of combustion zones having such lively combustion that due to excessive release of energy melting of the starting material might take place, while organic impurities are enclosed in the molten mass. On the other hand, organic gases carried along in the pyrolysis gases are to be burnt in the process cycle to thus supply energy from the process itself to the pyrolysis gas before again being conducted through the mineral wool waste.

In view of the long sojourn times of the mineral wool waste in the pyrolysis oven, possibly extending to e.g. one hour, there results a reduced performance of the facility in exchange for a given expense of investment. As furthermore external energy is required which is lost prior to insertion into the molten mass due to cooling, this also results in relatively high energy costs. Altogether this method is satisfactory in a technical context, not however in an economic one.

From EP-A-389 314, on the other hand, it is known to melt the mineral wool waste in a melting unit and thereby burn the organic impurities. Pure oxygen or air strongly enriched with oxygen is utilised to attain a high-temperature combustion above the liquid level of the molten mass, such that the organic impurity material is burnt there as completely as possible before the heat generated in this combustion causes melting of the mineral wool waste in this location. Apart from start-up or auxiliary burners, the overwhelming part of the melting energy is derived from high-temperature combustion of the organic impurities.

Besides relatively high costs of investment, considerable costs—with the exception of relatively low fuel costs—are incurred for the oxygen. Handling the oxygen in the rough production operation furthermore requires particular precautions rendering the method more expensive in terms of technical facilities and personnel. Moreover the large amount of energy contained in the exhaust gas is lost, and the exhaust gas requires a separate exhaust gas purification. The energy of the produced molten mass is also lost as the molten mass in practical operation is evacuated via a feeder and fritted, and the waste material is added to the mixture of raw materials of the melting tub as a frit.

The invention is based on a conventional, fossile-fuel melting tub. Herein the melting energy is introduced by combustion of fuel, mostly fuel gas, and combustion air, with flames forming above the surface of the melting bath. At the bottom of the melting tub, molten mass is withdrawn and supplied to a fiberising unit producing discontinuous mineral fibres which form the mineral wool after their deposition on a production conveyor. The combustion air is pre-heated through heat exchange with the exhaust gases of the tub. The remaining energy of the exhaust gases is then used to pre-heat the mixture of starting materials, with the exhaust gases subsequently, in a given case, being released into the atmosphere following a further heat exchange with the combustion air and a corresponding purification. Temperature control and the composition of the molten mass and of the exhaust gases are particularly critical parameters as the temperature of the molten mass must be maintained precisely during its fiberisation, and variations of the molten mass composition followed by corresponding variations of properties must be avoided. The exhaust gas composition should be as constant as possible in order to prevent enriching the molten mass with certain substances which are filtered out during heat exchange with the mixture of starting materials and again supplied together with the mixture of starting materials. The system is therefore relatively sensitive to any external influences with regard to substances and energy which disturb the set condition.

As mineral wool waste furthermore has heat insulating properties, which means that a relatively long time is required until the melting temperature is attained on its side facing away from the molten mass when placed on the latter, and as the wool furthermore has a tendency to become airborne in the eddying flow of flames above the melting bath and thus pollute the exhaust gas, the aim has formerly always been to charge the mineral wool waste—in a given case after eliminating its carbon content—well blended with the mixture of starting materials. In this way, the mineral wool waste was to be made a part as homogeneous as possible of the mixture of starting materials in order to disturb the set operation as little as possible.

SUMMARY OF THE INVENTION

It is the object of the invention to provide a method and a device of the kind whereby the use of mineral wool waste as a recycled starting material is successful in a cost-efficient manner and yet without any detrimental effects on the melting process.

In terms of process technology, this object is achieved according to the invention by providing a method for producing mineral wool. The method includes introducing mineral wool waste, fuel and air into a combustion fuel melting unit; combusting the fuel and air in the melting unit to melt the mineral wool waste to form a recycled molten material, producing a first exhaust gas; introducing air, fuel and a raw material into a melting unit; combusting the fuel and air in the melting unit to melt the raw material and produce a molten mass and tub exhaust gas; introducing the recycled molten material and the first exhaust gas into the melting unit such that the molten material mixes with the molten mass and the first exhaust gas mixes with the tub exhaust gas; using the exhaust gas discharged from the melting tub to heat the air introduced into the melting tub and air introduced into the melting unit; and attenuating the molten mass into discontinuous fibers and depositing the fibers to form mineral wool in random orientation.

The fact that the molten mass is directly supplied to the melting tub from the melting unit, i.e. while still in the molten liquid state, and there brought together with the molten mass produced from the fresh mixture of raw materials, results in the energetic advantage of the energy from the combustion of the organic impurities being made usable for the melting process. Where the additional melting unit did not require any external energy supply, and mineral wool waste was charged in a 1:1 ratio with the fresh mixture of raw materials, approximately half of the energy for the melting process may thus be saved, and correspondingly less when applying additional external energy. Due to the fact that the exhaust gas of the additional melting unit is also supplied to the melting tub and evacuated together with the tub exhaust gas, not only is the energy content of the exhaust gas from the additional melting unit used for pre-heating the combustion air, and in a given case also the energy content of the mixture of raw materials downstream, but treatment of the exhaust gas from the additional melting unit together with the tub exhaust gas is also carried out, without separate investments in technical facilities being required.

Altogether this results in an interconnection of melting tub and melting unit quite similar to an operation of the melting tub entirely without recycled starting material, with fresh mixture of raw materials only: in a sense, a functional part of the melting tub is merely removed to the additional melting unit in order to there melt the recycled starting material instead of the fresh mixture of raw materials under optimum conditions, with the molten mass as well as the exhaust gas, however, immediately being reunited, such that the resulting conditions at the connections of the melting tub for molten mass on the one hand and for exhaust gas on the other hand hardly differ from those prevailing in a case where the entire molten mass is obtained from a fresh mixture of raw materials. The additional melting unit thus, so to speak, pertains to the inner "melting tub" complex without affecting the outside, except for reduced firing of the melting tub. In particular, it is possible at any time without detrimental effects on the operation of the installation to resume operation without any recycled starting material, or to utilise varying amounts of recycled starting material.

Whereas it is possible to construct the additional melting unit in the manner of EP-A-389 314 and to charge it with oxygen or air enriched with oxygen, it is preferred to also operate the additional melting unit with combustion air which is also pre-heated by means of the heat energy of the tub exhaust gas. Combustion air is always meant to designate air having atmospheric composition. As a result, no costs or special handling measures for oxygen are necessary. Furthermore there is no difference to normal operation of the melting tub without recycled starting material as regards the supplied combustion air, and also the arising exhaust gas in its composition and amount to a very large extent corresponds to the tub exhaust gas arising in normal operation.

When furthermore part of the combustion air pre-heated in heat exchange with the exhaust gas is diverted and channelled towards further heat exchange with additional combustion air supplied to the additional melting unit in order to pre-heat it, this results in utilising part of the heat energy released by the exhaust gases for pre-heating the combustion air of the additional melting unit without, however, the combustion air having entered into heat exchange with the exhaust gas actually having to be supplied to the additional melting unit. To this end, it is rather possible to separately supply combustion air which, however, receives heat energy for its pre-heating from the exhaust gas pre-heated through heat exchange with the combustion air. This is particularly of importance if, for constructional reasons, the pressure of the combustion air entered into heat exchange with the exhaust gas is too low for entering into the additional melting unit, for more strongly compressed combustion air may then be supplied to the latter in a simple manner and brought into heat exchange with the low-pressure combustion air on its way to the additional melting unit.

In accordance with the invention it is provided that the diverted combustion air provided for the heat exchange with the further combustion air, following its further heat exchange upstream of the heat exchanger for the exhaust gas, is again supplied to the combustion air for the melting tub. This results in a circuit of the diverted combustion air from the branch-off point downstream of the heat exchanger with the exhaust gas to a recycling location upstream of the heat exchanger for the exhaust gas, where the re-routed combustion air is mixed with the freshly supplied combustion air and again brought into heat exchange with the exhaust gas. If necessary, the pre-heating effect of multiple passages through the heat exchanger with the exhaust gas may here be made use of in order to attain a higher entry temperature of the combustion air into the melting tub than without such a circuit, i.e. if 100% fresh combustion air were sucked in at approx. 20° C.

In a particularly preferred development of the invention, a melting cyclone is used as a melting unit. Melting cyclones are known per se and used particularly in the field of pyrometallurgical treatment of ore concentrates. Reference is made to DE-C-2 348 105, DE-C-2 938 001, DE-C-2 952 330, DE-C-3 101 369, DE-C-3 335 859, DE-A-3 374 099 and DE-C-3 607 774, which are hereby fully incorporated herein by way of reference. The melting process in the melting cyclone takes place inside the flame present within the cyclone. Due to the high flow velocities and the resulting good heat transfer, particles are melted very rapidly. The molten mass exits together with the exhaust gas through a concentric hole in the bottom of the cyclone. Similar to the case of EP-A-389 314, it is possible to also utilise the combustion heat of the organic constituents for the melting process, resulting in reduced energy consumption. In any case, however, external fuel should be introduced into the melting cyclone in such amounts that a rapid combustion of the organic impurities largely free of residues is ensured in view of the high flow velocities.

In a preferred embodiment of the invention, it is provided that preliminary shredding of the mineral wool waste to particle sizes of less than 2 mm is carried out. This ensures particle sizes particularly favorable for heat transfer in the melting cyclone.

In a particularly preferred embodiment of the invention, the molten mass is channelled from the additional melting unit to a small height above the level of the melting bath and from there introduced into the molten mass of the melting tub at low kinetic energy. This ensures that introducing the molten mass will not bring about strong local circulating motions in the melting tub which might strain and prematurely damage the refractory walling.

In terms of device technology, the object is attained by providing a device for producing mineral wool. The device includes a melting tub for combusting fuel and air to melt a raw material to produce a molten mass, the melting tub being constructed and arranged to contain the molten mass at a certain level. A first heat exchanger is fluidly coupled to the melting tub to receive tub exhaust gas and exchange heat of the tub exhaust has with the air. An air supply conduit introduces the air into the heat exchanger. A conduit is disposed between the heat exchanger and the melting tub for directing the air from the heat exchanger to the melting tub. A fuel supply conduit supplies the fuel to the melting tub and a feeder supplies the raw material into the melting tub. A melting unit is provided for combusting fuel and air to melt mineral wool waste to produce a recycled molten material and exhaust gas. Transfer structure transfers the molten material to the melting tub. A flow channelling structure is constructed and arranged to direct the melting unit exhaust gas into the melting tub. A compressor and second heat exchanger are fluidly coupled to the melting unit such that air may be compressed in the compressor and heated in the heat exchanger prior to entering the melting unit.

Because the molten recycled material intermediately stores the energy expended in the additional melting unit, additional energy for melting a meanwhile solidified molten recycled material may advantageously fall away. The same is analogously true for the recycling exhaust gas which is also supplied directly from the additional melting unit through the introduction device to the exhaust gas of the melting tub without an essential loss of energy. Due to the direct connection of the additional melting unit with the melting tub by means of the introduction device, and combination of the mass flows of molten recycled material and molten mass on the one hand and recycling exhaust gas and tub exhaust gas on the other hand, cost-intense additional devices for separately conducting the mass flows may advantageously be left away.

For the additional melting unit, a separate feeding conduct for recycling combustion air with a compressor for sucking in and compressing the combustion air is provided in accordance with the invention. This creates the advantageous possibility of selecting temperature and pressure of the recycling combustion air independently of the combustion air for the melting tub. A further advantage is that herefor normal atmospheric air may find use, resulting in a similarity of the recycling exhaust gas and the tub exhaust gas and in a thus simplified combination of the exhaust gas flows for heat utilisation and after-treatment.

The separate combustion air circuit for processing the combustion air for the melting tub serves to attain several purposes at the same time. For one thing, temperature and pressure of the combustion air for the melting tub can be adjusted independently of the corresponding parameters of the recycling combustion air such as to be optimal for the melting process. Secondly, it is advantageously possible to divert part of the combustion air pre-heated in the recuperator and to provide it to the heat exchanger for pre-heating the recycling combustion air. Fresh air from the environment may furthermore be admixed to this diverted air flow in the respectively required amounts by means of the supply conduit, such that the full mass flow results through the recuperator.

Thermally coupling the combustion air circuit with the supply conduit for recycling combustion air through the heat exchanger makes it possible to use the heat of the tub exhaust gas not only for heating the combustion air for the melting tub, but advantageously also for heating the recycling combustion air. Hereby the use of external energy for heating the recycling combustion air may be eliminated.

The advantages of using a melting cyclone as an additional melting unit in accordance with the invention have already been discussed above. In particular the extremely high combustion velocities of the eddying flow in the combustion chamber guarantee residue-free combustion of the impurities of the mineral wool waste without reintroduction of the impurities into the obtained recycled molten mass. By using a melting cyclone, it is achieved that the impurities remain in the recycling exhaust gas.

Introducing the recycled molten mass into the molten mass in the melting tub takes place, such that the recycled molten mass is superposed onto the molten mass in the melting tub at a low velocity from a small height. Local eddying flows are thus avoided, such that the temperature profile of the molten mass is not disturbed by it. Moreover the additional stress on the refractory walling of the melting tub brought about by intense circulating motions is avoided.

BRIEF DESCRIPTION OF THE DRAWINGS

Further details, features and advantages of the invention can be taken from the following discussion of embodiments by referring to the drawing, wherein:

FIG. 2 shows a vertical section of a melting tub arrangement of the invention.

DETAILED DESCRIPTION OF THE INVENTION

Figure 1:
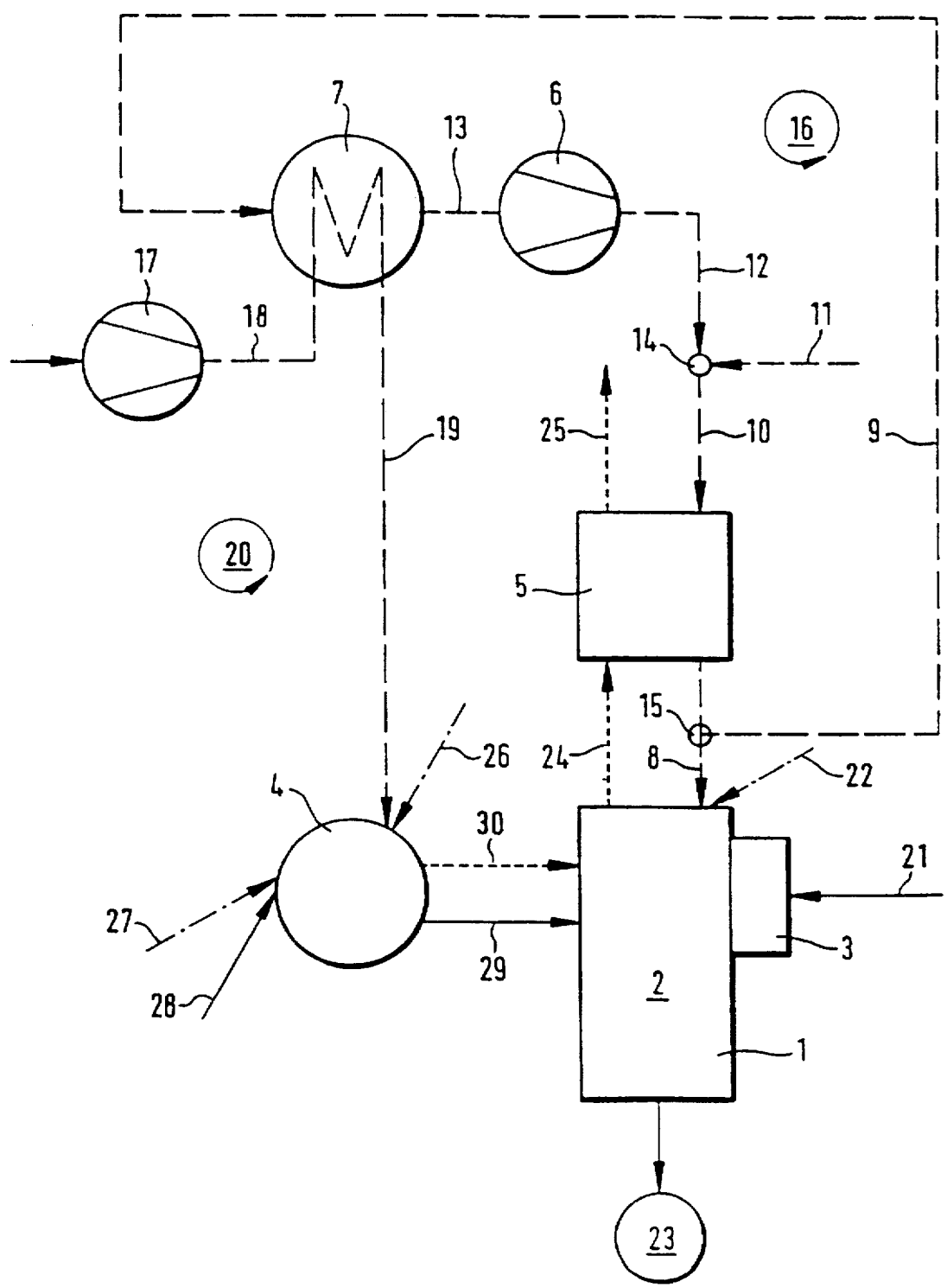
FIG. 1 shows the method sequence of mineral wool recycling in the form of a flow chart.

FIG. 1 shows a melting tub 1 containing a molten mass 2 and provided with a feeder 3 as a feeding device. The melting tub 1 is associated with an additional melting unit 4 having the form of a cyclone oven, and a recuperator 5. Furthermore a fan 6 and a counter-flow heat exchanger 7 together with conduits 8, 9, 10, 11, 12, 13 for combustion air, a supply conduit 14, and a branching 15 form a combustion air circuit 16. A compressor 17, forms a supply conduit 20 for recycling combustion air together with the heat exchanger 7 and conduits 18, 19 for the combustion air of the cyclone oven.

Pre-heated combustion air and finally fuel 22 are supplied to the melting tub 1 by means of the feeder 3 serving as the device for feeding a mixture of raw material 21, and through the conduit 8 for combustion air. The obtained molten mass 2 is fed to a fiberising unit 23. Generated exhaust gas of the melting tub 1 flows through a conduit 24 to the recuperator 5.

Inside the recuperator 5, the tub exhaust gas flowing in through the conduit 24 releases heat energy for pre-heating to the combustion air fed through the conduit 10 by the fan 6 and flowing through the conduit 8 into the melting tub 1.

Subsequently the combustion air flows from the recuperator 5 through a conduit 25 to a starting material pre-heater (not shown), wherein the heat energy of the tub exhaust gas for pre-heating the mixture of starting materials 21 is derived. Subsequently the cooled-down exhaust gas is purified of pollutants by filters (not shown) and discharged into the environment.

The combustion air circuit 16 is constructed such that combustion air is sucked in from the environment through the conduit 11 and admixed to the combustion air approaching in the conduit 12 via the supply 14, to then flow together through the conduit 10 to the recuperator 5. In the recuperator 5 this combustion air heat energy is transferred from the exhaust gas. The pre-heated combustion air then flows through the conduit 8 to the melting tub 1. Prior to that, part of the pre-heated combustion air can be diverted at the branching 15 and supplied through the conduit 9 to the heat exchanger 7, wherein heat energy is derived from this combustion air in order to pre-heat the combustion air flowing through the conduit 18 to the heat exchanger 7. This combustion air somewhat cooled thereby is conveyed on through the conduit 13 from the heat exchanger 7 to the fan 6 and flows again through the conduit 12 to the supply conduit 14. Here this combustion air is again mixed with the combustion air sucked in from the environment through the conduit 11.

In the supply conduit 20 for the recycling combustion air, combustion air from the environment is compressed by means of the compressor 17 which preferably is a rotary piston compressor, and supplied to the heat exchanger 7 through the conduit 18. In the heat exchanger 7, heat energy from the combustion air of the combustion air circuit 16 entering through conduit 9 is transferred to the combustion air of the supply conduit 20 for the recycling combustion air. This pre-heated combustion air flows through the conduit 19 to the melting unit 4.

The additional melting unit 4 is furthermore supplied with fuel 26 as well as feed air 27 and mineral wool waste 28. A molten recycled material 29 obtained in the melting unit 4 as well as resulting recycling exhaust gas 30 are supplied to the melting tub 1.

In operation, the melting tub 1 is continuously charged with fresh mixture of raw materials 21, e.g. 10 metric tons of basalt per day, via the feeder 3 as the feeding device. Firing the melting tub 1 is traditionally carried out with fossile fuel which, in this case, is supplied in the form of the fuel 22 of the melting tub 1 in order to provide the heat energy necessary for generating the desired molten glass material 2. Introducing the heat energy is carried out across the surface of the melting bath through combustion of the fuel 22 with the pre-heated combustion air which is supplied through the combustion air conduit 11. The molten mass 2 is continuously withdrawn at the bottom of the melting tub 1 and supplied to a fiberising unit 23 which produces 21 metric tons of glass wool per day.

In addition to fresh mixture of raw materials 21, molten recycled material 29 having a temperature of 1350° C. can be supplied to the melting bath 1 together with the recycling exhaust gas 30 from the melting unit 4, which has a temperature of 1500° C.

The recycling exhaust gas 30 blends with the exhaust gas from the combustion process of the melting tub 1 and is supplied to the recuperator 5 as a tub exhaust gas at a temperature of 1400° C. through the conduit 24. In the recuperator 5, the tub exhaust gas having a temperature of 1400° C. serves to pre-heat the combustion air fed through the combustion air conduit 10, and afterwards to pre-heat the fresh mixture of starting materials 21. Subsequently the tub exhaust gas is further treated in filters to remove the pollutants.

The combustion air circuit 16 starts by sucking in the combustion air through the conduit 11 from the environment at a temperature of 20° C. The sucked-in combustion air is supplied at the supply conduit 14 of the combustion air supplied in the conduit 12 by means of the fan 6 and mixed with it. In the heat exchanger 7, the combustion air supplied in the conduit 12 has previously released heat energy to the combustion air supplied through the conduit 18 in order to pre-heat it to the temperature desired for supplying it into the additional melting unit 4. The combustion air in the conduit 10 then flows through the recuperator 5 and in the process absorbs heat energy from the tub exhaust gas, to then again re-feed part of the pre-heated combustion air to the branching 15 in the combustion air circuit 16 and to supply the remaining part through the conduit 8 to the melting tub 1 as pre-heated combustion air.

The combustion air of the supply conduit 20 for recycling combustion air for the additional melting unit 4 is also sucked in from the environment, then compressed to the system pressure of approx. 1.3 bar in the melting unit 4 by means of the compressor 17 and heated to the desired 650° C. in the heat exchanger 7 through supplying heat energy from the combustion air supplied in the conduit 9.

The additional melting unit 4 described in FIG. 1 and schematically represented in FIG. 2 is in the present embodiment formed in the manner of a melting cyclone, however some other oven-like formation is possible.

The melting unit 4 essentially consists of a melting cyclone 31 which in turn is essentially made up of a preferably cylindrical wall 32, a lid 33 comprising a funnel-shaped device 34 for charging the mineral wool waste 28, and a bottom 35 comprising an outlet 36 for the molten recycled material 29 and the recycling exhaust gas 30. The melting cyclone 31 is encased by a cooling device 37 comprising a cooling water inlet 38 and a cooling water outlet 39. The melting cyclone 31 furthermore comprises a combustion air supply conduit 40 and a fuel supply 41. The melting cyclone 31 is in an exemplary case positioned immediately adjacent to the melting tub 1, and in FIG. 2 its direct cooperation therewith is illustrated.

The mineral wool waste 28 is supplied to the melting cyclone 31 via the charging device 34 by means of the feed air 27. The fuel 26 is introduced through the fuel supply conduit 41 which may be tube-shaped and which is arranged concentrically in flow direction in the center of the jet of pre-heated combustion air also supplied there. The combustion air 19 and the fuel 26 blend with each other and flow into the melting cyclone 31 as a mixture.

The mineral wool waste 28 supplied to the melting cyclone 31 and the combustion air blended with the fuel 26 which are blown into the melting cyclone 31 burn in a strong eddying flow 48 inside the combustion cheer 47 of the melting cyclone 31. In the present embodiment, the molten recycled material 29 formed as a result and the forming recycling exhaust gas 30 flow through the outlet 36 of the melting cyclone 31 into an introduction device 43 and from there into the melting tub 1.

Herein the molten recycled material 29 following a molten mass channel 42 (not shown) and the recycling exhaust gas 30 flow together through the introduction device 43 into the melting tub 1, which is thermally sealed by a vault 44 and communicating with the introduction device 43 over an opening 45. Via the feeder 3 the melting tub 1 is supplied with fresh mixture of raw materials 21. The molten recycled material 29 from the melting cyclone 31 flows through the introduction device 43 and is smoothly supplied to the molten mass 2 through a suitable superposing device 46 for entering into the molten mass 2 from a small height at a velocity approximating zero relative to the molten mass 2.

During operation, blowing the combustion air into the melting cyclone 31 is achieved through the combustion air supply conduit 40, having the form of a concentric casing around the fuel 26, advantageously with an initial spin such that through the eddying flow in the combustion zone in the combustion chamber 47 perfect, residue-free combustion of the impurities in the mineral wool waste 28 and its melting proper without reintroduction of present impurities is ensured.

In the melting cyclone itself, the added mineral wool waste 28 is melted at a corresponding temperature and the adhering or enclosed impurities are released and burnt. Here the energy introduction by carbon-containing impurities in the mineral wool waste is advantageously made use of. The strong eddying flow 48 in the combustion chamber 47 ensures complete combustion of the impurities and also that the impurities are not again enclosed in the freshly obtained molten recycled material 29, but evacuated in the recycling exhaust gas 30. The recycling exhaust gas 30 is added to the exhaust gas from the melting tub 1 and purified of impurities after the heat energy has been utilised for pre-heating the combustion air and the mixture of starting materials 21.

The invention thus provides a method and a device for producing mineral wool by using mineral wool waste as a recycled starting material. The melting tub for producing the molten mass from a mixture of starting materials is herein associated with an additional melting unit, by means of which a molten recycled material is obtained from the mineral wool waste, the quality and composition of which, as desired, correspond to those of the molten mass obtained from the mixture of raw materials. The molten recycled material is supplied to the molten mass in the melting tub through a suitable introduction device. The recycling exhaust gas from the additional melting unit is fed to the tub exhaust gas and the exhaust gas mixture is utilised for pre-heating the combustion air and the mixture of raw materials. By dividing the "molten mass preparation" into the conventional production of molten mass from a mixture of raw materials in the melting tub and concurrent production of molten mass from starting material waste in an additional melting unit, the molten mass products of which as well as the exhaust gas are directly supplied to the melting tub, it is for the first time possible to carry out the complicated control of the process parameters in conventional production of molten mass separately from control of the process parameters in melting recycleable starting material waste which is no less delicate, and thus also optimise it. Combining the mass flows of the molten mass and of the exhaust gases downstream of the melting tub enables optimum heat energy recycling of the heat stored in the exhaust gas through the use of heat exchangers and a conventional further processing of the molten mass into mineral wool products.

We claim:

1. A method for producing mineral wool including the steps of:

introducing mineral wool waste, fuel and air into a combustion fuel melting unit, combusting the fuel and air in the melting unit to melt the mineral wool waste to form a recycled molten material thereby producing a first exhaust gas, introducing air, fuel and a raw material into a melting tub, combusting the fuel and air in said melting tub to melt the raw material and produce a molten mass and tub exhaust gas, introducing the recycled molten material and said first exhaust gas into the melting tub such that the molten material mixes with the molten mass and the first exhaust gas mixes with the tub exhaust gas, using the exhaust gas discharged from said melting tub to heat the air introduced into the melting tub, attenuating the molten mass into discontinuous fibers and depositing the fibers to form mineral wool in random orientation, and diverting a portion of the air heated by the exhaust gas discharged from said melting tub, channelling the portion of air in heat exchange relation with additional air so as to heat the additional air and introducing at least a portion of additional air into said melting unit.

2. The method according to claim 1, further including introducing a second portion of the additional air into said melting tub.

3. The method according to claim 1, including shredding the mineral wool waste to particle sizes of less than 2 mm prior to melting the mineral wool waste.

4. The method according to claim 1, wherein the step of introducing the recycled molten material to said melting tub includes channelling the molten material to the melting at a height above a liquid level of the molten mass in said melting tub at a velocity substantially equal to zero, relative to the molten mass.

5. A device for producing mineral wool comprising:

a melting tub for combusting fuel and air to melt a raw material to produce a molten mass, said melting tub being constructed and arranged to contain the molten mass at a certain level, a first heat exchanger fluidly coupled to said melting tub to receive tub exhaust gas and exchange heat of the tub exhaust with the air, an air supply conduit for introducing the air into said heat exchanger, a conduit between said heat exchanger and said melting tub for directing the air from said heat exchanger to said melting tub, a fuel supply conduit for supplying the fuel to said melting tub, a feeder for supplying the raw material into said melting tub, a melting unit for combusting fuel and air to melt mineral wool waste to produce a recycled molten material and exhaust gas, transfer structure for transferring the molten material to the melting tub;

flow channelling structure constructed and arranged to direct the melting unit exhaust gas into said melting tub, and a compressor and a second heat exchanger fluidly coupled to said melting unit such that air may be compressed in the compressor and heated in the heat exchanger prior to entering the melting unit.

6. A device for producing mineral wool comprising:

a melting tub for combusting fuel and air to melt a raw material to produce a molten mass, said melting tub being constructed and arranged to contain the molten mass at a certain level, a first heat exchanger fluidly coupled to said melting tub to receive tub exhaust gas and exchange heat of the tub exhaust with the air, an air supply conduit for introducing the air into said heat exchanger, a conduit between said heat exchanger and said melting tub for directing the air from said heat exchanger to said melting tub, a fuel supply conduit for supplying the fuel to said melting tub, a feeder for supplying the raw material into said melting tub, a melting unit for combusting fuel and air to melt mineral wool waste to produce a recycled molten material and exhaust gas, transfer structure for transferring the molten material to the melting tub;

flow channelling structure constructed and arranged to direct the melting unit exhaust gas into said melting tub, and a combustion air circuit constructed and arranged such that air may be channeled from said air supply conduit to said first heat exchanger, and said conduit between said heat exchanger and said melting tub including a bypass downstream of said first heat exchanger such that one portion of said air may be directed to said melting tub and another portion of the air may be directed to a second heat exchanger and air exiting said second heat exchanger may be directed to said first heat exchanger.

7. The device according to claim 6, further comprising a fan in said air circuit between said first and second heat exchangers.

8. The device according to any one of claims 5, through 7, wherein said melting unit is a melting cyclone constructed and arranged to receive feed air and fuel and the mineral wool waste.

9. The device according to claim 5, wherein said first heat exchanger is a recuperator.

10. The device according to claim 5, wherein said transfer structure is constructed and arranged to transfer the molten material to the melting tub at a low velocity and at a height above said certain level.

* * * * *